United States Patent
Oonishi

(10) Patent No.: US 12,440,936 B2
(45) Date of Patent: Oct. 14, 2025

(54) CONTROL DEVICE AND CONTROL SYSTEM FOR MACHINE TOOL

(71) Applicant: FANUC CORPORATION, Yamanashi (JP)

(72) Inventor: Nobuhito Oonishi, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 442 days.

(21) Appl. No.: 17/998,496

(22) PCT Filed: May 12, 2021

(86) PCT No.: PCT/JP2021/017997
§ 371 (c)(1),
(2) Date: Nov. 11, 2022

(87) PCT Pub. No.: WO2021/230276
PCT Pub. Date: Nov. 18, 2021

(65) Prior Publication Data
US 2023/0201986 A1    Jun. 29, 2023

(30) Foreign Application Priority Data
May 14, 2020 (JP) ................... 2020-085295

(51) Int. Cl.
G05B 19/402 (2006.01)
B23B 5/36 (2006.01)
B23Q 15/24 (2006.01)

(52) U.S. Cl.
CPC ............... *B23Q 15/24* (2013.01); *B23B 5/36* (2013.01); *G05B 19/402* (2013.01); *G05B 2219/36086* (2013.01)

(58) Field of Classification Search
CPC ........ B23Q 15/24; B23Q 27/003; B23B 5/36; G05B 19/402; G05B 2219/36086; G05B 19/40931; G05B 2219/45236
See application file for complete search history.

(56) References Cited

U.S. PATENT DOCUMENTS

| | | | |
|---|---|---|---|
| 4,651,599 A * | 3/1987 | Ley | B23Q 27/00 451/211 |
| 4,883,392 A | 11/1989 | Lieser | |

(Continued)

FOREIGN PATENT DOCUMENTS

| | | |
|---|---|---|
| DE | 3424494 A1 | 1/1986 |
| JP | 66399114 A | 4/1988 |

(Continued)

OTHER PUBLICATIONS

Zhang, Xiaodong, et al. "Machining of optical freeform prisms by rotating tools turning." CIRP annals 61.1 (2012): 519-522. (Year: 2012).*

(Continued)

*Primary Examiner* — Christopher E. Everett
(74) *Attorney, Agent, or Firm* — HAUPTMAN HAM, LLP

(57) ABSTRACT

A control device that controls polygon turning to simultaneously rotate a workpiece and a tool and form a polygon on a surface of the workpiece acquires information on misalignment in the radial direction of a cutting tool attached to a tool body and generates pluses to correct the misalignment in the radial direction of the cutting tool. Furthermore, the control device outputs the pulses to an X-axis servo motor and moves a tool in the opposite direction to the misalignment in the radial direction of the cutting tool. Accordingly, (Continued)

the misalignment in the radial direction of the cutting tool is corrected, and thereby the precision of the polygon turning is improved.

4 Claims, 7 Drawing Sheets

(56) References Cited

U.S. PATENT DOCUMENTS

| | | | | |
|---|---|---|---|---|
| 5,224,404 | A | * | 7/1993 | Kono ................... B23Q 27/00 82/1.11 |
| 6,298,758 | B1 | | 10/2001 | Wu |
| 6,761,096 | B1 | * | 7/2004 | Kochsiek ............... B23Q 27/00 82/1.11 |
| 2009/0160958 | A1 | | 6/2009 | Yamada et al. |
| 2016/0039009 | A1 | * | 2/2016 | Matsumaru .......... B23Q 27/006 82/1.11 |
| 2016/0045959 | A1 | * | 2/2016 | Matsumaru .......... B23Q 27/006 82/1.11 |
| 2022/0266364 | A1 | * | 8/2022 | Hoss ...................... B23F 5/163 |

FOREIGN PATENT DOCUMENTS

| | | |
|---|---|---|
| JP | S63105802 A | 5/1988 |
| JP | S63312012 A | 12/1988 |
| JP | H7266194 A | 10/1995 |
| JP | 2003157114 A | 5/2003 |
| JP | 2008-264937 A | 11/2008 |
| JP | 2014-168837 A | 9/2014 |
| JP | 201579348 A | 4/2015 |
| JP | 2015-139858 A | 8/2015 |
| JP | 2018140482 A | 9/2018 |
| JP | 2018147030 A | 9/2018 |
| JP | 2020-059073 A | 4/2020 |
| KR | 20090068112 A | 6/2009 |
| WO | 2016148116 A1 | 9/2016 |

OTHER PUBLICATIONS

International Search Report in PCT/JP2021/017997, mailed Jul. 20, 2021. 3pp.
Notice of Allowance for CN Application No. 202180033862.2 mailed Apr. 28, 2025, 5pp.

* cited by examiner

······· NORMAL POLYGON TURNING
—·—·— ONE CUTTING TOOL MISALIGNED

······· NORMAL POLYGON TURNING
—·—·— ONE CUTTING TOOL MISALIGNED IN PHASE
——— POLYGON TURNING OF PRESENT INVENTION

QUADRANGLE

HEXAGON

CONTROL DEVICE AND CONTROL SYSTEM FOR MACHINE TOOL

RELATED APPLICATIONS

The present application is a National Phase of International Application No. PCT/JP2021/017997 filed May 12, 2021, which claims priority to Japanese Application No. 2020-085295, filed May 14, 2020.

TECHNICAL FIELD

The present invention relates to a control device and a control system for a machine tool that performs polygon turning.

BACKGROUND ART

Conventionally, there has been polygon turning to process a workpiece into a shape of a polygon by rotating a tool and the workpiece at a constant ratio. In polygon turning, each tool edge draws an elliptical orbit about a workpiece. When the rotation ratio of a workpiece and a tool and the number of tools are changed, the phase or the number of ellipses changes, and accordingly, the workpiece can be processed into a polygon such as a quadrangle or a hexagon.

FIG. 7A illustrates a motion path of a tool edge relative to a workpiece when the workpiece center is defined as the origin. In this example, the rotation ratio of the workpiece and the tool is 1:2, and the number of tools is two. The motion path of a tool T1 relative to the workpiece is orbit 1, and the motion path of a tool T2 relative to the workpiece is orbit 2. For one turn of the workpiece, the two tools T1 and T2 draw the elliptical orbits around the workpiece, and a quadrangle is formed on the workpiece surface. FIG. 7B illustrates motion paths of the tools T when the rotation ratio is 1:2 and the number of tools is three. In this case, when the three tools draw elliptical orbits around a workpiece and cut the workpiece surface along these orbits, a hexagon is formed.

Tools for performing polygon turning are called polygon cutters and are each formed of a tool body and cutting tools attached to the tool body. Patent Literature 1 discloses that a polygon turning tool is formed of an annular cutter body, three cutting inserts, three fixing bolts provided to fix these three inserts, respectively, and positioning bolts for aligning tool edges of the inserts.

In the processing tool (corresponding to a polygon cutter) of Patent Literature 1 described above, when arranged and fixed to a vacancy of the cutter body, each insert (corresponding to a cutting tool) is attached such that one of the cutting edges projects out of the outer circumferential face of the tool body. Once the cutting edge is fixed by the fixing bolts, rotation of the insert in the vacancy is stopped by the clamping force of the fixing bolts.

The processing tool of Patent Literature 1 is configured such that the inserts are mounted on the cutter body, and thereby the precision of polygon turning is increased with a larger tool diameter without requiring an increase in the size of the tool mechanism. Further, the positioning bolts and the fixing bolts are provided to enhance the cutting tool aligning function.

[Citation List]
 [Patent Literature]
  Patent Literature 1: Japanese Patent Application Laid-Open No. 2018-140482

SUMMARY OF INVENTION

Technical Problem

Although the positioning bolts and the fixing bolts are provided to increase the cutting tool positioning precision in the processing tool of Patent Literature 1, the cutting tools are manually attached, and this may cause slight misalignment of the attachment position. Further, in polygon turning, respective cutting tools repeat cutting and idle running while rotating, and a load occurring when the cutting tool and the tool come into contact with each other may cause misalignment of the attachment position or a deformation of the tool. Such misalignment of the attachment position or a deformation of the tool affects the precision of the processed shape.

As illustrated in FIG. 7A and FIG. 7B, since polygon turning is to form a polygon by using a combination of ellipses, a resulted cut surface has a shallow curve. Thus, polygon turning is unsuitable for such high-precision processing that requires high flatness. Polygon turning takes a shorter processing time than such processing that uses a milling machine or the like to form a polygon. Thus, polygon turning has been used for processing of a member that does not require high precision in practical use (such as a head of a bolt or a bit of a driver).

With improved precision of polygon turning, however, high-precision processing can be made in a short processing time.

In the field of polygon turning, there is a demand for a technique to improve precision.

Solution to Problem

One disclosure of the present invention is a control device that controls polygon turning to simultaneously rotate a workpiece and a tool and form a polygon on a surface of the workpiece, and the control device includes: a workpiece axis command generation unit that generates a command for an angular velocity of the workpiece; a tool axis command generation unit that generates a command for an angular velocity of the tool; a deviation acquisition unit that acquires information on misalignment in a radial direction of a cutting tool attached to the tool; an adjustment amount generation unit that, based on the information on the misalignment in the radial direction of the cutting tool acquired by the deviation acquisition unit, generates a pulse to adjust any one or both of motion of a tool axis and motion of a workpiece axis; and an adjustment amount command unit that outputs the pulse and moves any one or both of the workpiece axis and the tool axis.

Another disclosure of the present invention is a control system that controls polygon turning to simultaneously rotate a workpiece and a tool and form a polygon on a surface of the workpiece, and the control system includes: a workpiece axis command generation unit that generates a command for an angular velocity of the workpiece; a tool axis command generation unit that generates a command for an angular velocity of the tool; a deviation acquisition unit that acquires information on misalignment in a radial direction of a cutting tool attached to the tool; an adjustment amount generation unit that, based on the information on the misalignment in the radial direction of the cutting tool acquired by the deviation acquisition unit, generates a pulse to adjust any one or both of a position of a tool axis and a position of a workpiece axis; and a motion axis command unit that moves both or any one of the workpiece axis and the tool axis in accordance with the pulse.

[Advantageous Effects of Invention]

According to the present disclosure, the precision of polygon turning can be improved.

DESCRIPTION OF EMBODIMENTS

Figure 1:
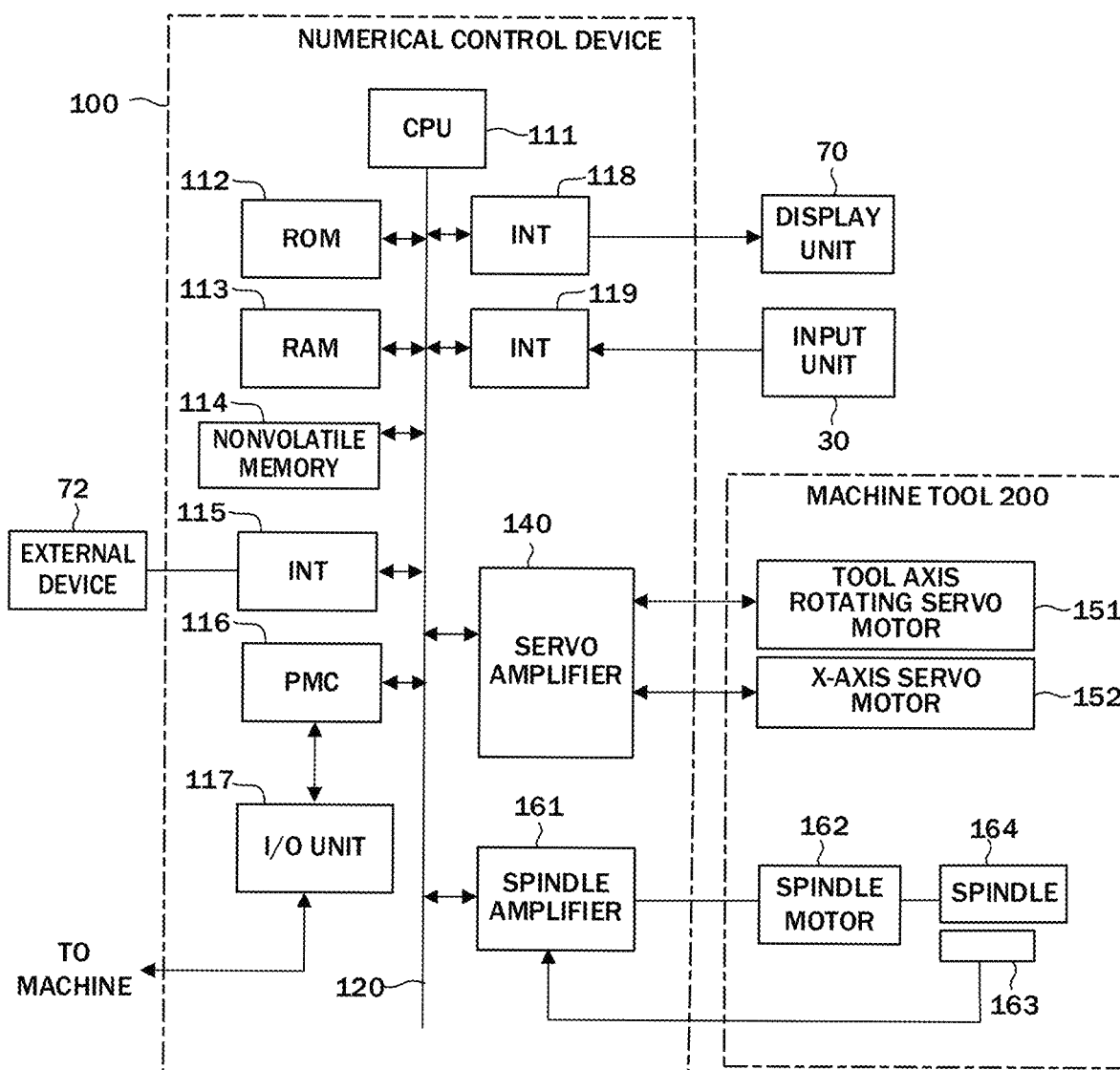
FIG. 1 is a hardware configuration diagram of a numerical control device in the present disclosure.

One example of a numerical control device 100 having an adjustment function for polygon turning will be illustrated below. As illustrated in FIG. 1, the numerical control device 100 includes a CPU 111 that controls the overall numerical control device 100, a ROM 112 that stores a program or data, and a RAM 113 into which data is temporarily loaded, and the CPU 111 reads a system program stored in the ROM 112 via a bus 120 and controls the overall numerical control device 100 in accordance with the system program.

A nonvolatile memory 114 is backed up or the like by a battery (not illustrated), for example, and the storage state is maintained even when the numerical control device 100 is powered off. The nonvolatile memory 114 stores a program loaded from an external device 72 via an interface 115, 118, or 119 or various data acquired from a user operation input via an input unit 30 or acquired from each unit of the numerical control device 100, a machine tool 200, or the like (for example, a setting parameter, sensor information, or the like).

The interface 115 is an interface for connecting the numerical control device 100 and the external device 72 such as an adaptor to each other. A program, various parameters, or the like are loaded from the external device 72 side. Further, a program, various parameters, or the like modified in the numerical control device 100 can be stored in an external storage unit via the external device 72. A programmable logic control (PLC) 116 performs input and output of a signal with the machine tool 200, a robot, and a device such as a sensor attached to the machine tool 200 or the robot via an I/O unit 117 and thereby controls the same by using a sequence program built in the numerical control device 100.

On a display unit 70, an operation screen of the machine tool 200, a display screen indicating the operation status of the machine tool 200, or the like are displayed. The input unit 30 is formed of an MDI, an operation panel, a touch panel, or the like and passes operation input made by a worker to the CPU 111.

The servo amplifier 140 controls respective axises of the machine tool 200. The servo amplifier 140 receives a command about the amount of axis motion from the CPU 111 and drives a servo motor. The machine tool 200 includes at least a tool axis rotating servo motor 151 and an X-axis servo motor 152 (or a Y-axis servo motor). The tool axis rotating servo motor 151 and the X-axis servo motor 152 (or the Y-axis servo motor) each have a built-in position/speed detector and feed a position/speed feedback signal from the position/speed detector back to the servo amplifier 140 to perform feedback control of the position/speed.

The numerical control device 100 sets a virtual coordinate system for the machine tool 200. In the following description, the center axis of a workpiece W is defined as a Z-axis, an axis connecting the workpiece center O to the tool center is defined as an X-axis, and an axis orthogonal to the X-axis and the Z-axis is defined as a Y-axis for illustration.

The machine tool 200 of the present disclosure includes at least the tool axis rotating servo motor 151 that rotates a tool U (tool axis) and the X-axis servo motor 152 that moves a tool rest (hereafter, referred to as the tool U) in the X-axis direction.

A spindle amplifier 161 receives a spindle rotation command for a spindle 164 of the machine tool 200 and drives a spindle motor 162. The power of the spindle motor 162 is transmitted to the spindle 164 via a gear, and the spindle 164 rotates at an instructed rotational rate. A position coder 163 is coupled to the spindle 164, the position coder 163 outputs feedback pulses in synchronization with the rotation of the spindle 164, and the feedback pulses are read by the CPU 111.

The workpiece W is attached to the spindle 164. The axis directions of the spindle 164 and the tool axis are parallel, and the spindle 164 and the tool axis rotate at a predetermined rotation ratio. When the spindle 164 and the tool axis rotate simultaneously, a tool U attached to the tool axis cuts the workpiece surface, and a polygon is formed on the workpiece surface.

Figure 2:
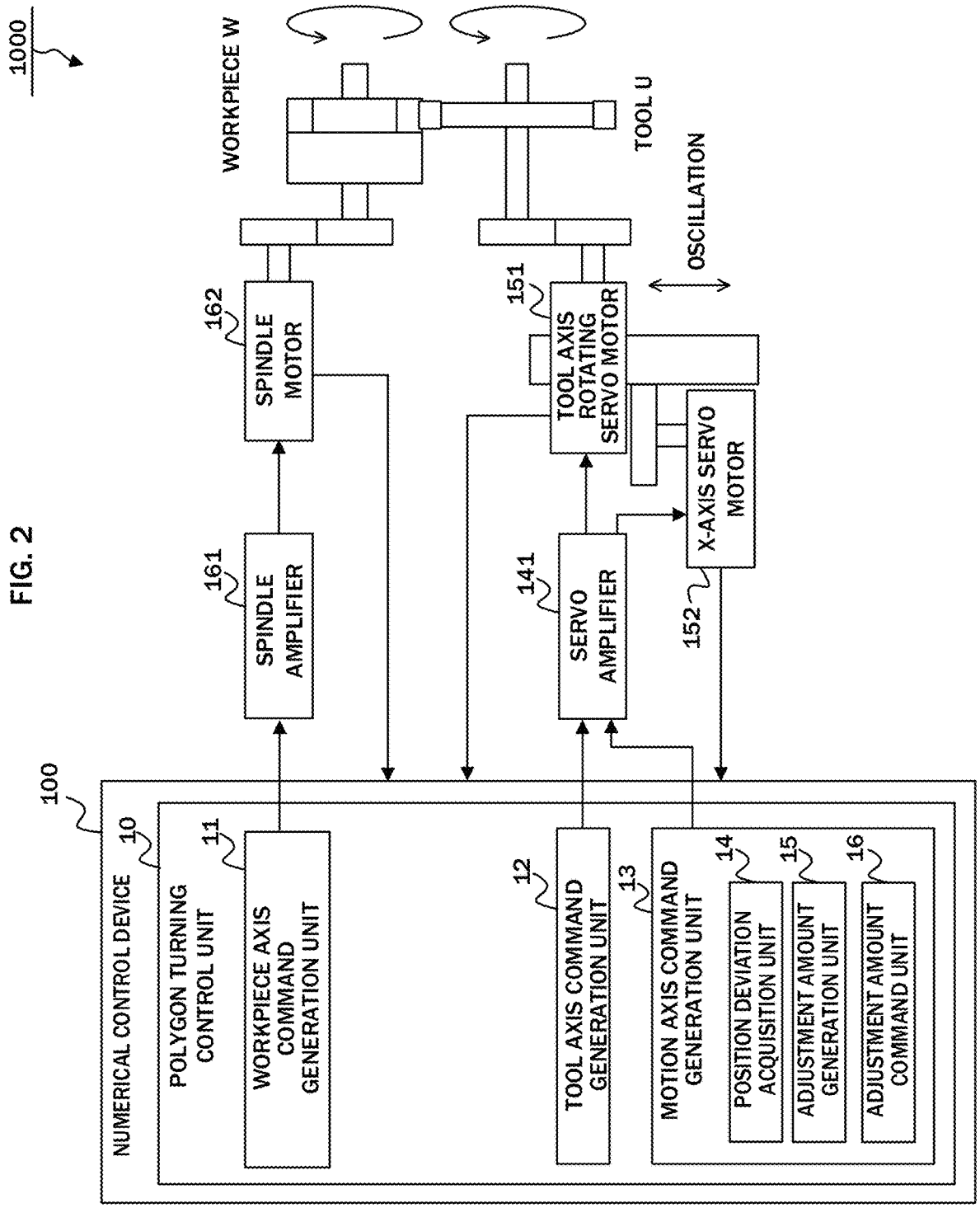
FIG. 2 is a block diagram of a control system in the present disclosure.

FIG. 2 is a block diagram of a control system 1000 having an adjustment function of polygon turning. The function in this block diagram is implemented when the CPU 111 of the numerical control device 100 executes a program stored in a storage device such as the ROM 112.

The numerical control device 100 includes a polygon turning control unit 10. The polygon turning control unit 10 includes a workpiece axis command generation unit 11 that generates a rotation command for the workpiece axis, a tool axis command generation unit 12 that generates a rotation command for the tool axis, and a motion axis command generation unit 13 that generates a motion command for the tool U.

The workpiece axis command generation unit 11 generates a rotation command for the spindle 164. The workpiece axis command generation unit 11 generates a command to rotate the spindle 164 at a constant angular velocity ω and outputs the command to the spindle amplifier 161. The spindle amplifier 161 controls the spindle motor 162 in accordance with the command from the workpiece axis command generation unit 11. The spindle motor 162 rotates the spindle 164 at a constant angular velocity ω. Accordingly, the workpiece W attached to the spindle 164 rotates at the constant angular velocity ω.

The tool axis command generation unit 12 generates a rotation command for the tool U. The tool axis command generation unit 12 generates a command to rotate the tool U at a constant angular velocity and outputs the command to the servo amplifier 140. The servo amplifier 140 controls the tool axis rotating servo motor 151 in accordance with the command from the tool axis command generation unit 12. The tool axis rotating servo motor 151 rotates the tool U at a constant angular velocity in accordance with the control of the servo amplifier 140. The angular velocity of the tool U is determined by the rotation ratio of the workpiece W to the tool U, and the angular velocity of the tool U is 2ω in an example described later.

The motion axis command generation unit 13 generates a motion command for a tool rest on which the tool U is placed. The motion command is to control the motion in the X-axis direction of the tool U.

The command of the X-axis direction is an adjustment amount in the radial direction of a cutting tool. The X-axis servo motor 152 adjusts the inter-axis distance between the tool axis and the workpiece axis in accordance with a command from the adjustment amount command unit 16.

A position deviation acquisition unit 14 acquires information on misalignment in the radial direction of the cutting tool T. A deviation amount σ in the radial direction of the cutting tool T can be measured by a caliper, an optical measuring instrument, an image measuring instrument, or the like, and a measuring method is not particularly specified. A measurement result is input to the position deviation acquisition unit 14.

The adjustment amount generation unit 15 calculates an adjustment amount $\mu_i$ with respect to a deviation amount $\sigma_i$ in the radial direction of each cutting tool $T_i$ and generates one or more pulses corresponding to the calculated adjustment amount $\mu_i$.

The adjustment amount command unit 16 outputs the pulse to the X-axis servo motor 152 during an idle running time. In accordance with the pulse, the tool axis moves in the X-axis direction. As a result, the inter-axis distance between the workpiece axis and the tool axis can be adjusted. The pulse changes, by the adjustment amount $\mu_i$, the inter-axis distance of a cutting tool used for next cutting (denoted as $T_i$) to correct misalignment in the radial direction of the cutting tool $T_i$. The adjustment of the inter-axis distance is performed at an idle running time of polygon turning. The idle running time means a period in which the cutting tool T of the tool U is not cutting the workpiece W and is rotating for nothing and does not affect cutting.

[Misalignment Adjustment Method of First Disclosure]

A misalignment adjustment method of the first disclosure will be described. In definition, the tool U used for performing polygon turning is referred to as a polygon cutter. A polygon cutter is formed of a cutter body and a cutting tool and is used by attaching the cutting tool to the cutter body. When a cutting tool is attached to a cutter body, an attachment error in the radial direction may occur. The attachment error affects the processing precision. Further, misalignment may be caused by wear of a cutting tool or a bearing. Such misalignment caused by wear also affects the processing precision.

The following equation is an equation for calculating an adjustment amount μ. In the present disclosure, the adjustment amount μ can be calculated by using the following equation regardless of the number N of cutting tools T or the deviation amount σ.

When a direction in which the tool U and the workpiece W come closer to each other is defined as the plus direction, the adjustment amount $\mu_i$ with respect to the deviation amount $\sigma_i$ in the radial direction for each cutting tool $T_i$ is expressed by the following equation:

$$\mu_i = \sigma_{i-1} - \sigma_i$$

(where $\mu_1 = \sigma_N - \sigma_1$ is established and the adjustment amount $\mu_i$ in the first cutting is $-\sigma_i$ in the above equation).

When the adjustment amount $\mu_i$ is calculated and the position of the tool axis is adjusted by $-\sigma_i$ in the first cutting in such a way, the deviation amount $+\sigma_i$ of the cutting tool $T_i$ is cancelled into zero. At the end of cutting by the cutting tool $T_i$, the deviation of the position of the tool axis is $-\sigma_i$. If the position of the tool axis is adjusted by $\sigma_i - \sigma_{i+1}$, the deviation of the position of the tool axis is $-\sigma_{i+1}$, and the deviation amount $-\sigma_{i+1}$ of the cutting tool $T_{i+1}$ is cancelled into zero. At the end of cutting by the cutting tool $T_{i+1}$, the deviation of the position of the tool axis is $-\sigma_{i+1}$. If the position of the tool axis is adjusted by $\sigma_{i+1} - \sigma_{i+2}$, the deviation of the tool axis is $-_{i+2}$, and the deviation amount $-\sigma_{i+2}$ of the cutting tool $T_{i+2}$ is cancelled into zero. The cutting tool $T_i$ is being rotated, and the adjustment amount $\mu_i$, periodically changes in accordance with the cutting tool $T_i$ used for cutting.

Figure 3A:
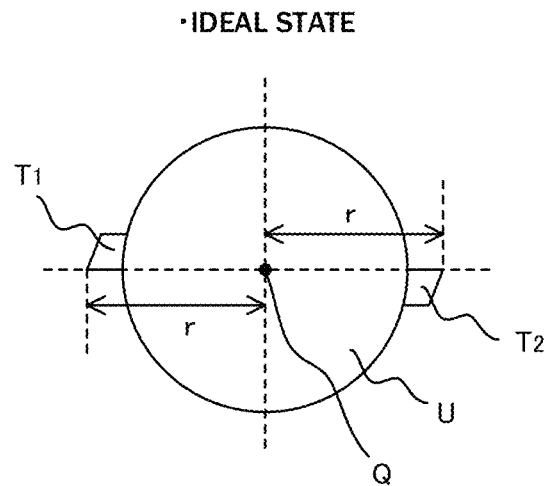
FIG. 3A is a diagram illustrating an example of a tool where misalignment in the radial direction has not occurred (an ideal state).
Figure 3B:
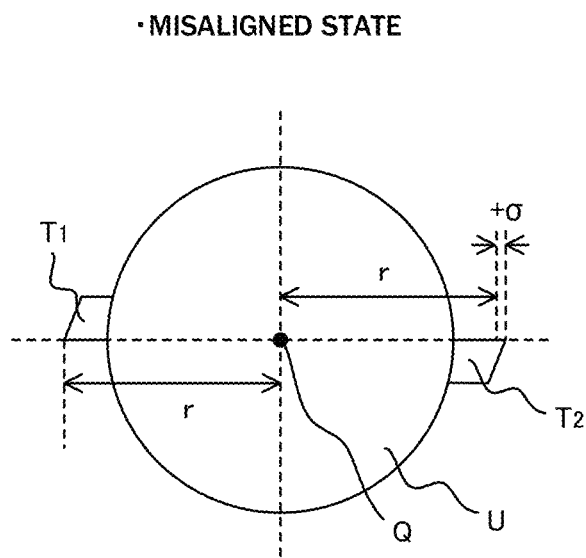
FIG. 3B is a diagram illustrating an example of a tool where misalignment in the radial direction has occurred (a misaligned state).

As a specific example, a method for calculating adjustment amounts $\mu_1$, $\mu_2$ of two cutting tools $T_1$, $T_2$ will be described with reference to FIG. 3A to FIG. 4C. FIG. 3A and FIG. 3B represent an example of attaching two cutting tools at the same interval. When two cutting tools are attached at the same interval, although the distances from the center Q of the tool U to the tool edges of the cutting tools will be ideally r as illustrated in FIG. 3A, misalignment (the deviation amount +σ) in the radial direction may occur as illustrated in FIG. 3B for some reason. When the cutting tool on the left side in FIG. 3B is $T_1$ and the cutting tool on the right side in FIG. 3B is $T_2$, the deviation amounts in the radial direction of the cutting tools $T_1$, $T_2$ are $(\sigma_1, \sigma_2) = (0, +\sigma)$.

Figure 4A:
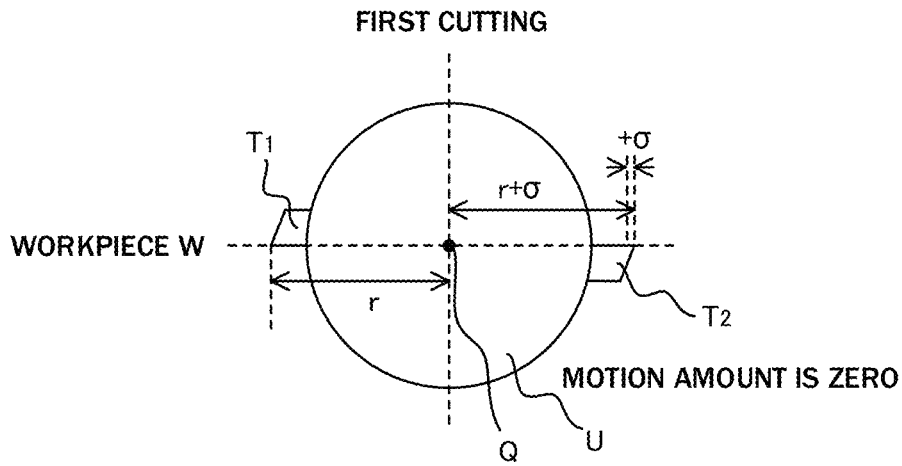
FIG. 4A is a diagram illustrating a method of correcting misalignment in the radial direction.
Figure 4B:
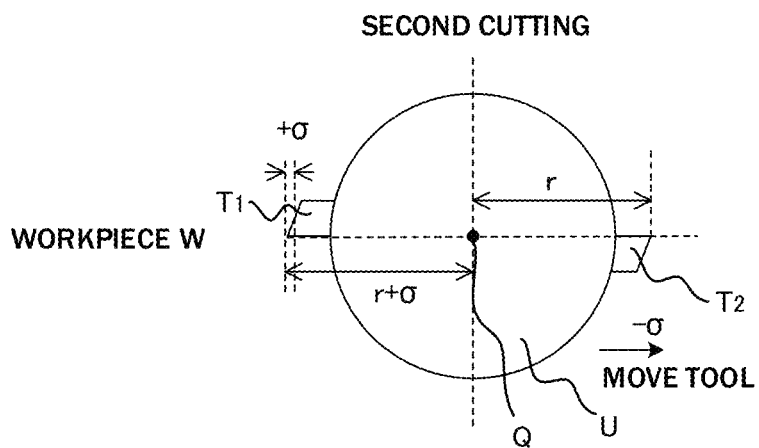
FIG. 4B is a diagram illustrating a method of correcting misalignment in the radial direction.
Figure 4C:
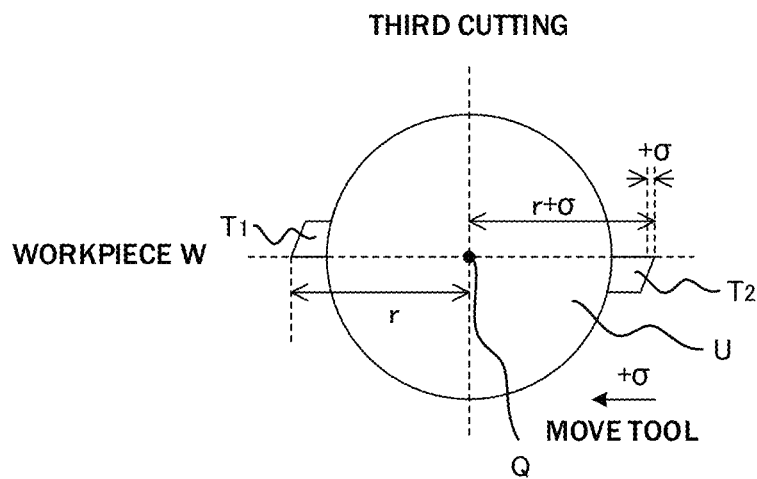
FIG. 4C is a diagram illustrating a method of correcting misalignment in the radial direction.

When the deviation amounts of the cutting tools $T_1$, $T_2$ are $(\sigma_1, \sigma_2) = (0, +\sigma)$, the adjustment amounts are $(\mu_1, \mu_2) = (+\sigma, -\sigma: -\sigma_i$ for only the first cutting) in accordance with the above equation. Referring to FIG. 4A to FIG. 4C for specific illustration, when cutting is performed by the cutting tool $T_1$ in the first cutting, since the deviation amount of the cutting tool $T_1$ is 0, no correction is performed (FIG. 4A). When cutting is performed by the cutting tool $T_2$ in the second cutting, since the cutting tool $T_2$ is misaligned by +σ in the radial direction, the tool U is moved by −σ in the X-axis direction to correct the deviation amount into zero in the idle running time before the workpiece W is cut by the cutting tool $T_2$ (FIG. 4B). In the third cutting, the tool U has been rotated by one turn, and cutting is performed again by the cutting tool $T_1$. The adjustment amount for the cutting tool $T_1$ is +σ. Thus, the tool U is moved by +σ in the X-axis direction to adjust the motion amount back to 0 in the idle running time before the workpiece W is cut by the cutting tool $T_1$ (FIG. 4C).

In such a way, when cutting is started with the cutting tool $T_1$, the tool U is moved in the X-axis direction in the order of 0, −σ, +σ, −σ, . . . to correct the misalignment in the radial direction.

Figure 5A:
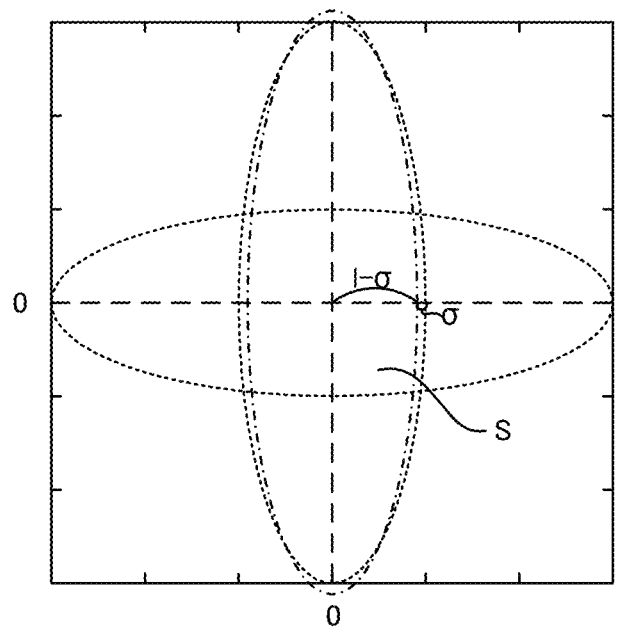
FIG. 5A is a diagram illustrating a change in the locus of cutting tools in the present disclosure.
Figure 5B:
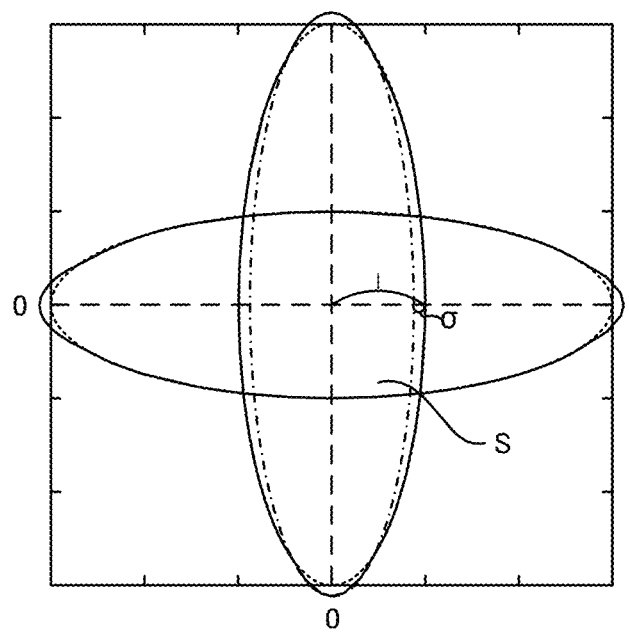
FIG. 5B is a diagram illustrating a change in the locus of cutting tools in the present disclosure.

As a result of correction, the locus of the cutting tool T changes as illustrated in FIG. 5A and FIG. 5B.

The dotted lines in FIG. 5A indicate the loci of cutting tools in ideal polygon turning, and a dot-dash line in FIG. 5A indicates the loci of cutting tools when there is misalignment in one of the cutting tools. If one of the cutting tools is misaligned by +σ from the reference length r, since the cutting amount of the cutting tool is longer by σ, the cutting tool T draws the locus indicated by the dot-dash line in FIG. 5A with respect to the workpiece W, and the distance from the workpiece center O to the cut side will be shorter by σ.

The solid lines in FIG. 5B indicate the loci of the cutting tools $T_1$, $T_2$ relative to the workpiece W when the tool is moved by −σ during cutting by the cutting tool $T_2$. It can be found that the locus of the corrected polygon turning overlaps the locus of the ideal polygon turning and follows the same locus. In such a way, since the position of the tool U is corrected and thereby the misalignment in the radial direction of the cutting tool T is corrected, the quadrangle S formed by the polygon turning becomes substantially a square.

[Second Disclosure]

[Measuring Method for Deviation amount σ]

In the second disclosure, a workpiece W obtained as a result of test processing is used to calculate the deviation amount σ in the radial direction. The deviation amount σ can be calculated by measuring the distance between the opposing surfaces of the workpiece W.

Measurement is performed by an operator, for example. The measuring instrument may be a caliper, an image measuring instrument, or the like but is not limited thereto. The operator inputs a measured distance to the input unit 30. Calculation of the deviation amount σ is performed by the position deviation acquisition unit 14.

Figure 6A:
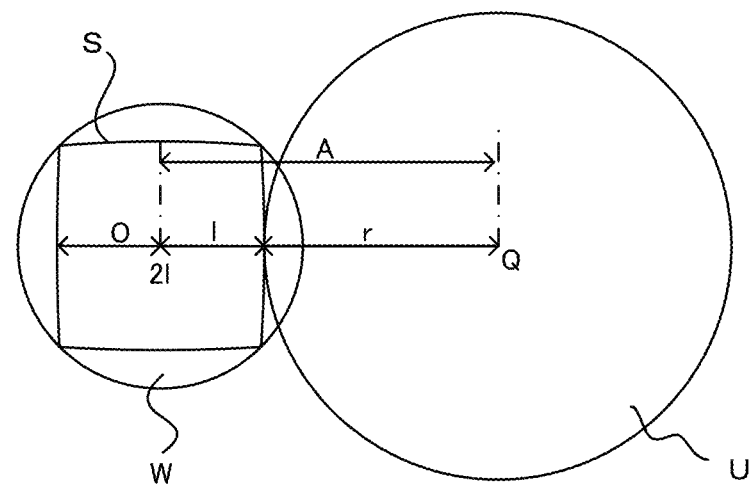
FIG. 6A is a diagram illustrating a method for calculating misalignment in the radial direction of a cutting tool based on a workpiece obtained as a result of test processing.

A method for calculating the deviation amount σ will be described with reference to FIG. 6A and FIG. 6B. FIG. 6A illustrates a shape of the workpiece W formed by the ideal tool U. The distance from the workpiece center O to the workpiece surface when the workpiece W is cut by the ideal tool U is denoted as 1.

Figure 6B:
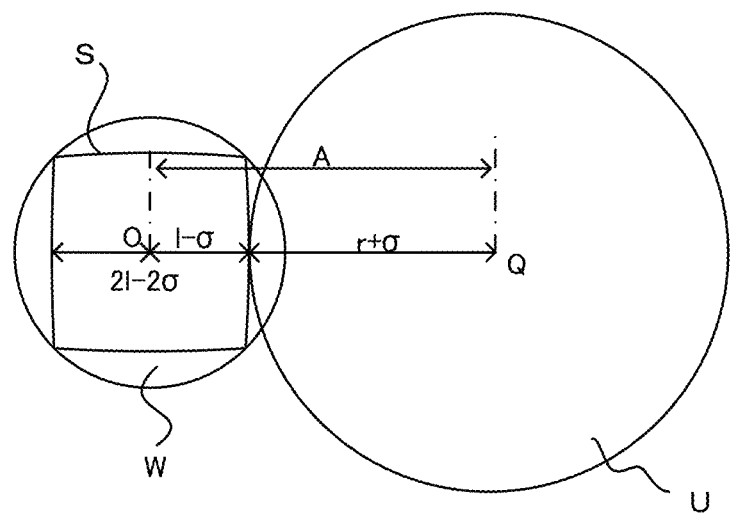
FIG. 6B is a diagram illustrating a method for calculating misalignment in the radial direction of a cutting tool based on a workpiece obtained as a result of test processing.
Figure 7A:
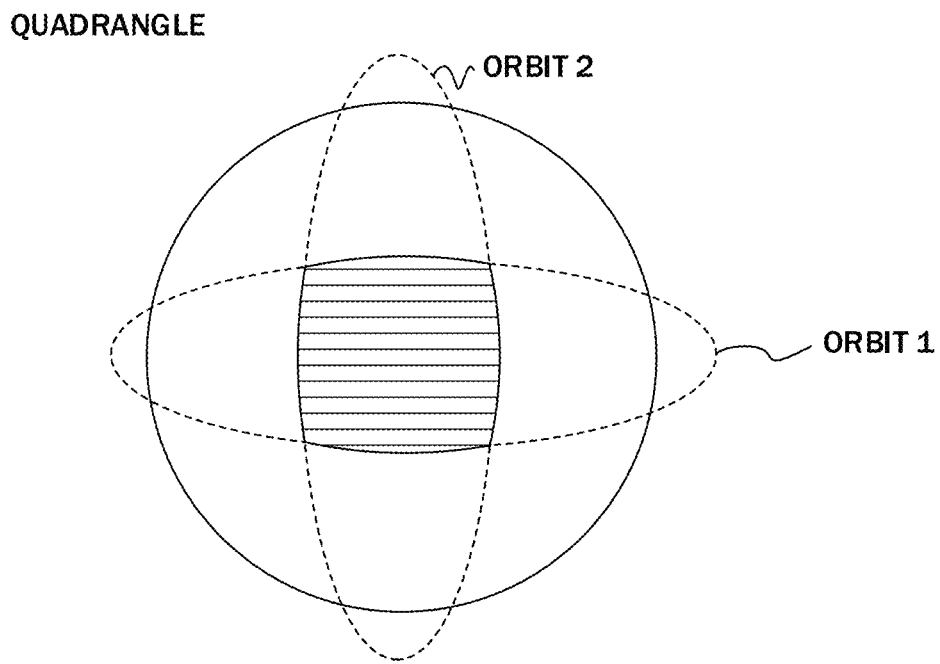
FIG. 7A is a diagram illustrating the conventional polygon turning.
Figure 7B:
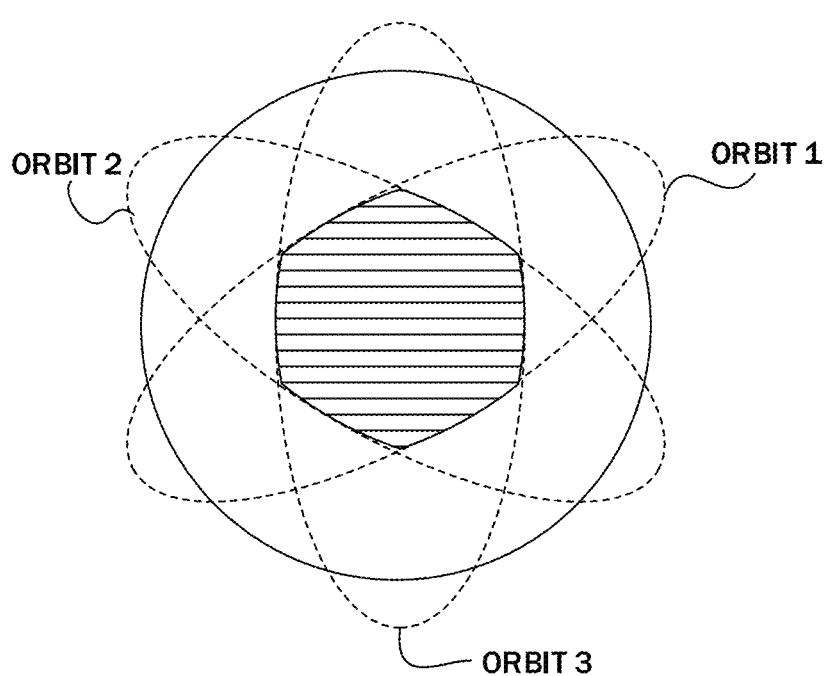
FIG. 7B is a diagram illustrating the conventional polygon turning.

If the tool edge of the tool U is misaligned by +σ, the cutting depth will be deeper by +σ, and thus, as illustrated in FIG. 6B, the distance from the workpiece center O to the workpiece surface will be shorter by +σ. The distance between the opposing surfaces of the workpiece at this time is 2·1−2σ. Since the value 1 is known, the deviation amount σ in the radial direction of the cutting tool T can be calculated if the distance between the opposing surfaces of the workpiece is measured.

The example of forming a quadrangle by using two cutting tools T has been described as an example. However, with the use of the method described above, the deviation amount σ in the radial direction of the cutting tool T can be calculated from the workpiece W obtained as a result of test processing regardless of the number of cutting tools T.

As described above, the numerical control device 100 of the present disclosure generates pulses in accordance with the deviation amount σ in the radial direction of the cutting tool T, moves the tool U in the X-axis direction in an idle running time of the tool axis, and thereby can correct the deviation amount in the radial direction of the cutting tool T without replacing the cutting tool T.

In the numerical control device 100 of the second disclosure, the deviation amount σ in the radial direction of the cutting tool T can be calculated by measuring the distance between the opposing surfaces of the workpiece W obtained as a result of test processing. Since the distance between the opposing surfaces of the workpiece W can be measured by an instrument such as caliper, no special measuring instrument is required.

Although one embodiment has been described above, the present invention is not limited to only the disclosure described above and can be implemented in various forms with addition of a suitable change. For example, although the present disclosure is configured such that the workpiece axis corresponds to the spindle axis and the tool axis corresponds to the servo axis, inter-spindle polygon turning in which both the two axises correspond to the spindle axis may be employed.

Further, the inter-spindle distance may be adjusted by moving the workpiece axis, instead of the tool axis, in the X-axis direction.

Further, correction of misalignment in the rotation direction and correction in the radial direction of the cutting tool T may be combined.

Typically, misalignment of the cutting tool T occurs not only in the radial direction but also in the rotation direction. It is thus desirable to use deviations in both the directions in combination to perform correction.

In the correction of misalignment in the rotation direction, first, the deviation amount δ in the rotation direction is determined. The deviation amount in the rotation direction can be calculated from the angle of a workpiece obtained as a result of test processing, for example. Further, misalignment can be detected by using load torque. In addition, a laser displacement meter, an angle meter, an image measuring instrument, or the like can also be used to directly measure the tool U to determine the deviation amount δ.

It is possible to correct the deviation amount δ by accelerating or decelerating the tool axis. That is, when the cutting tool T is misaligned in the plus direction from the reference phase, the tool axis is decelerated to adjust the deviation amount to zero. Further, when the cutting tool T is misaligned in the minus direction from the reference phase, the tool axis is accelerated to adjust the deviation amount to zero.

The deviation amount δ in the rotation direction differs for each cutting tool T. Thus, when the deviation amount in the rotation direction of the cutting tool $T_i$ is defined as $δ_i$, the deviation amount $δ_i$ in the rotation direction and the deviation amount $σ_i$ in the radial direction are corrected simultaneously in an idle running time before cutting is performed by the cutting tool $T_i$.

When correction of the rotation direction and correction of the radial direction are performed simultaneously, the precision of polygon turning can be improved without requiring replacement of a cutting tool.

The invention claimed is:

1. A control device configured to control polygon turning to simultaneously rotate a workpiece and a tool and form a polygon on a surface of the workpiece, the control device comprising:

a processor configured to generate a command for an angular velocity of the workpiece;

generate a command for an angular velocity of the tool;

acquire information on misalignment in a radial direction of a cutting tool attached to the tool;

generate, based on the information on the misalignment in the radial direction of the cutting tool, a pulse to adjust any one or both of a position of a tool axis and a position of a workpiece axis; and output the pulse to the tool in idle running of the tool in the polygon turning to control the tool axis or the workpiece axis to move according to the pulse.

2. The control device according to claim 1, wherein the processor is configured to adjust an inter-axis distance between the workpiece axis and the tool axis.

3. The control device according to claim 1, wherein the information on the misalignment in the radial direction of the cutting tool is a distance between opposing surfaces of a workpiece after test processing is performed.

4. A control system configured to control polygon turning to simultaneously rotate a workpiece and a tool and form a polygon on a surface of the workpiece, the control system comprising:
- a processor configured to
- generate a command for an angular velocity of the workpiece;
- generate a command for an angular velocity of the tool;
- acquire information on misalignment in a radial direction of a cutting tool attached to the tool;
- generate, based on the acquired information on the misalignment in the radial direction of the cutting tool, generate a pulse to adjust any one or both of motion of a tool axis and motion of a workpiece axis;
- output the pulse in idle running of the tool in the polygon turning; and
- move both or any one of the workpiece axis and the tool axis according to the pulse.

\* \* \* \* \*